US012794739B2

(12) United States Patent
Xiao et al.

(10) Patent No.: US 12,794,739 B2
(45) Date of Patent: Nov. 10, 2026

(54) CHANNEL RESTORATION METHOD AND RECEIVING DEVICE

(71) Applicant: GUANGDONG OPPO MOBILE TELECOMMUNICATIONS CORP., LTD., Dongguan (CN)

(72) Inventors: Han Xiao, Dongguan (CN); Wenqiang Tian, Dongguan (CN); Wendong Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 364 days.

(21) Appl. No.: 18/382,104

(22) Filed: Oct. 20, 2023

(65) Prior Publication Data

US 2024/0048413 A1 Feb. 8, 2024

Related U.S. Application Data

(63) Continuation of application No. PCT/CN2021/089099, filed on Apr. 22, 2021.

(51) Int. Cl.
*H04L 25/02* (2006.01)
*G06N 3/045* (2023.01)
(Continued)

(52) U.S. Cl.
CPC ...... *H04L 25/0254* (2013.01); *H04L 25/0224* (2013.01); *H04L 25/025* (2013.01); *H04L 25/03* (2013.01)

(58) Field of Classification Search
None
See application file for complete search history.

(56) References Cited

U.S. PATENT DOCUMENTS 12,166,606 B2 * 12/2024 Nguyen .............. H04L 25/0204
2021/0264255 A1 * 8/2021 Yoo ...................... G06N 3/0495
(Continued)

FOREIGN PATENT DOCUMENTS

CN 107135024 A 9/2017
CN 108566257 A 9/2018
(Continued)

OTHER PUBLICATIONS

International Search Report and Written Opinion dated Jan. 12, 2022 in International Application No. PCT/CN2021/089099, 4 pages. English translation attached.
(Continued)

*Primary Examiner* — Duc T Duong
(74) *Attorney, Agent, or Firm* — Sheppard, Mullin, Richter & Hampton LLP

(57) ABSTRACT

The embodiments of the present disclosure provide a channel restoration method and a receiving device, capable of performing channel restoration based on a neural network, thereby improving channel restoration performance and in turn improving data restoration and channel feedback performance. The channel restoration method includes: receiving, by a receiving device, a pilot signal and a data signal transmitted by a transmitting device; extracting, by the receiving device, channel correlation features from target information using a first neural network to obtain a target feature map, the target information including the data signal and the pilot signal, or the target information including the data signal and a pilot position channel determined based on the pilot signal; and performing, by the receiving device, channel restoration processing on the target feature map and the pilot position channel using a second neural network to obtain restored channel information.

17 Claims, 9 Drawing Sheets

(51) Int. Cl.
*H04L 5/02* (2006.01)
*H04L 25/03* (2006.01)

(56) References Cited

U.S. PATENT DOCUMENTS

| | | | | |
|---|---|---|---|---|
| 2022/0014398 | A1* | 1/2022 | Andrews | H04L 25/0254 |
| 2022/0376956 | A1* | 11/2022 | Wesemann | H04L 25/0224 |
| 2023/0261905 | A1* | 8/2023 | Wang | G06N 3/0464<br>370/329 |
| 2023/0362042 | A1* | 11/2023 | Honkala | H04L 27/261 |

FOREIGN PATENT DOCUMENTS

| | | | | |
|---|---|---|---|---|
| CN | 109617847 A | | 4/2019 | |
| CN | 110611627 A | | 12/2019 | |
| CN | 111464465 A | | 7/2020 | |
| WO | 2019171141 A2 | | 9/2019 | |
| WO | 2020092391 A1 | | 5/2020 | |
| WO | WO-2021253936 A1 | * | 12/2021 | H04L 25/0254 |

OTHER PUBLICATIONS

Extended European Search Report for European Patent Application No. EP21937354.5 mailed on May 14, 2024.
Soltani et al., "Deep Learning-Based Channel Estimation", IEEE Communications Letters, vol. 23, No. 4, Apr. 1, 2019, 4 pages.
Han et al., "A Deep Learning based Channel Estimation Scheme for IEEE 802.11p Systems", IEEE, May 20, 2019, 6 pages.
Wang et al., "Pilot-Assisted Channel Estimation and Signal Detection in Uplink Multi-User MIMO Systems With Deep Learning", IEEE Access, vol. 8, IEEE, Mar. 13, 2020, 11 pages.

* cited by examiner

CHANNEL RESTORATION METHOD AND RECEIVING DEVICE

CROSS-REFERENCE TO RELATED APPLICATIONS

This application is a continuation of International Application No. PCT/CN2021/089099 filed on Apr. 22, 2021, the entire disclosure of which is incorporated herein by reference.

TECHNICAL FIELD

The embodiments of the present disclosure relate to communication technology, and more particularly, to a channel restoration method and a receiving device.

BACKGROUND

In wireless communications, a receiving device can use algorithms such as Least Squares (LS) and Minimum Mean Square Error (MMSE) to perform channel estimation and restoration based on reference signals. However, due to the complexity and time-varying characteristics of real-world channel, it is difficult for the algorithms such as LS and MMSE to meet the requirements of channel estimation and restoration, which in turn affects the performance of subsequent data restoration and channel information feedback. How to improve channel restoration performance is a technical problem to be solved.

SUMMARY

The embodiments of the present disclosure provide a channel restoration method and a receiving device, capable of performing channel restoration based on a neural network, thereby improving channel restoration performance and in turn improving data restoration and channel feedback performance.

In a first aspect, a channel restoration method is provided. The method includes:

- receiving, by a receiving device, a pilot signal and a data signal transmitted by a transmitting device;
- extracting, by the receiving device, channel correlation features from target information by means of a first neural network to obtain a target feature map, the target information including the data signal and the pilot signal, or the target information including the data signal and a pilot position channel determined based on the pilot signal; and
- performing, by the receiving device, channel restoration processing on the target feature map and the pilot position channel by means of a second neural network to obtain restored channel information.

In a second aspect, a channel restoration method is provided. The method includes:

- receiving, by a receiving device, a pilot signal and a data signal transmitted by a transmitting device; and
- performing, by the receiving device, channel restoration processing on target information by means of a neural network to obtain restored channel information, the target information including at least the data signal and the pilot signal.

In a third aspect, a receiving device is provided. The receiving device is configured to perform the method according to the above first aspect.

In particular, the receiving device includes one or more functional modules configured to perform the method according to the above first aspect.

In a fourth aspect, a receiving device is provided. The receiving device is configured to perform the method according to the above second aspect.

In particular, the receiving device includes one or more functional modules configured to perform the method according to the above second aspect.

In a fifth aspect, a receiving device is provided. The receiving device includes a processor and a memory. The memory is configured to store a computer program, and the processor is configured to invoke and execute the computer program stored in the memory to perform the method according to the above first aspect.

In a sixth aspect, a receiving device is provided. The receiving device includes a processor and a memory. The memory is configured to store a computer program, and the processor is configured to invoke and execute the computer program stored in the memory to perform the method according to the above second aspect.

In a seventh aspect, an apparatus is provided. The chip is configured to perform the method according to any of the above first and second aspects.

In particular, the apparatus includes a processor configured to invoke and execute a computer program from a memory, to enable a device provided with the apparatus to perform the method according to any of the above first and second aspects.

In an eighth aspect, a computer-readable storage medium is provided. The computer-readable storage medium is configured to store a computer program that enables a computer to perform the method according to any of the above first and second aspects.

In a ninth aspect, a computer program product is provided. The computer program product includes computer program instructions that cause a computer to perform the method according to any of the above first and second aspects.

In a tenth aspect, a computer program is provided. The computer program, when executed on a computer, causes the computer to perform the method according to any of the above first and second aspects.

With the above technical solutions, channel restoration can be performed based on the neural network, such that the channel restoration performance can be improved, and in turn the data restoration and channel feedback performance can be improved.

DESCRIPTION OF EMBODIMENTS

Figure 1:
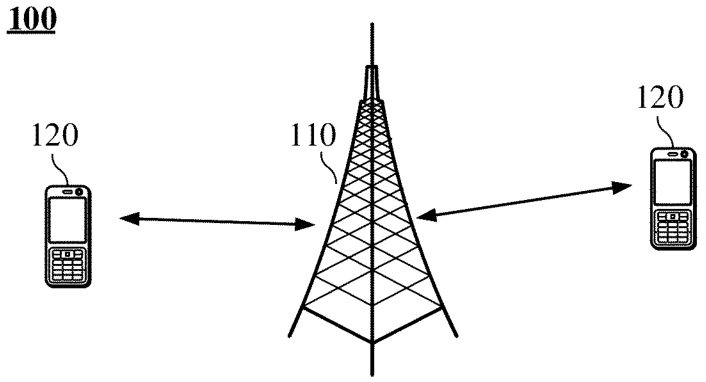
FIG. 1 is a schematic diagram showing a communication system architecture in which an embodiment of the present disclosure can be applied.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5 th Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

In some embodiments, the communication system of an embodiment of the present disclosure may be applied to a Carrier Aggregation (CA) scenario, a Dual Connectivity (DC) scenario, a Standalone (SA) network deployment scenario, and the like.

In some embodiments, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a vehicle-mounted terminal device, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. In some embodiments, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. In some embodiments, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 shows a communication system 100 in which an embodiment of the present disclosure can be applied. A shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In order to better understand the embodiments of the present disclosure, the wireless communication system related to the present disclosure will be described.

In a wireless communication system, the basic workflow is that a transmitter performs operations such as encoding and modulation on a source at a transmitting end to form a transmission signal to be transmitted. The transmission signal is transmitted to a receiving end via a wireless space channel. The receiver performs operations such as decoding, decryption and demodulation on the received information, and finally restores the source information, as shown in FIG. 2.

Figure 2:
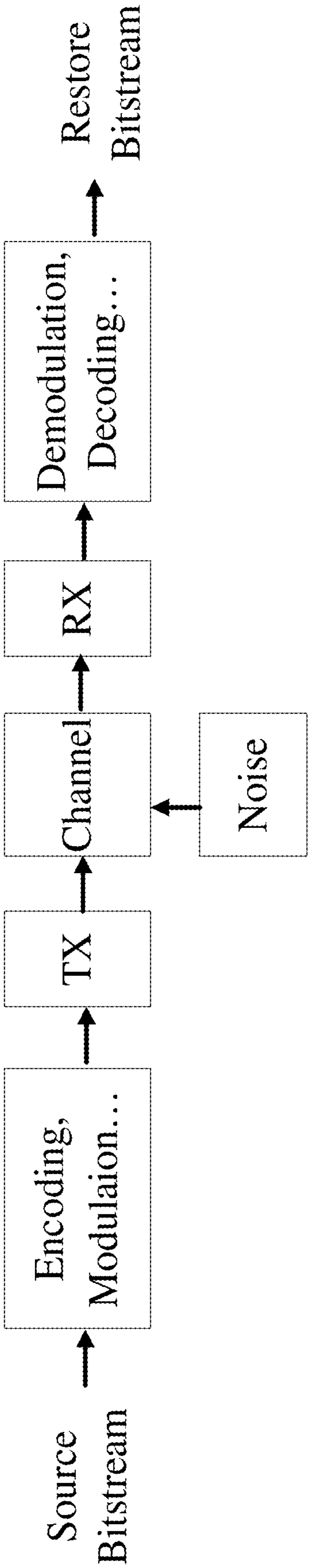
FIG. 2 is a schematic diagram showing a wireless communication system according to the present disclosure.

In the communication process shown in FIG. 2 above, modules such as encoding and modulation and modules such as decoding and demodulation in the conventional communication system, and other modules such as resource mapping, precoding, channel estimation, and interference cancellation that are not listed here, are all designed and implemented separately, and then these independent modules are integrated into a complete wireless communication system.

To facilitate better understanding of the embodiments of the present disclosure, channel estimation and channel restoration related to the present disclosure will be described.

Figure 3:
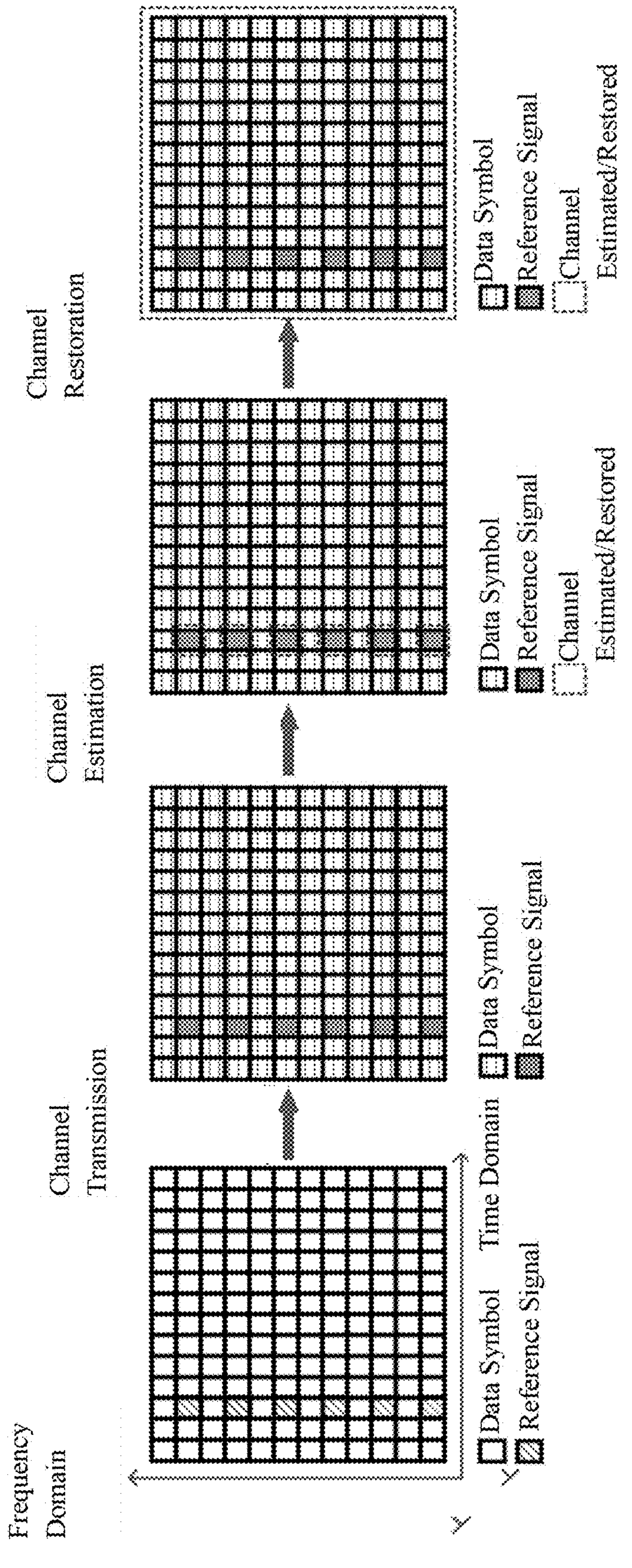
FIG. 3 is a schematic diagram showing channel estimation and channel restoration according to the present disclosure.

Due to the complexity and time-varying characteristics of the wireless channel environment, in the above wireless communication system, the estimation and restoration of the wireless channel by the receiver directly decide the final data restoration performance. The channel estimation and restoration process in the communication system can be shown in FIG. 3. In addition to information data symbols, the transmitter also transmits a series of specific pilot symbols known to the receiver on time-frequency resources, such as Channel State Information Reference Signal (CSI-RS), Demodulation Reference Signal (DMRS), etc. For the channel estimation stage, the receiver can estimate channel information at the position of the reference signal based on the real pilot and the received pilot by means of methods such as Least Square (LS). In the channel restoration stage, the receiver restores the channel information on full time-frequency resources based on the channel information estimated on the pilot position by means of an interpolation algorithm, for subsequent channel information feedback or data restoration.

In order to better understand the embodiments of the present disclosure, a neural network related to the present disclosure will be described.

Figure 4:
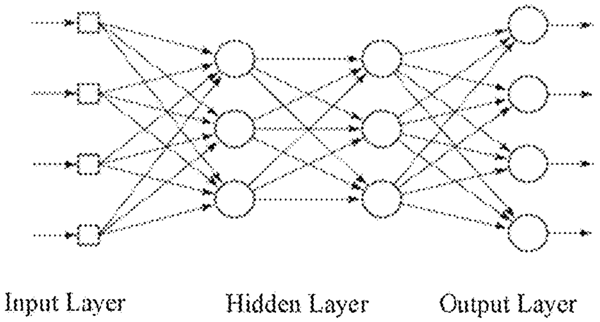
FIG. 4 is a schematic diagram showing a neural network according to the present disclosure.

The basic structure of a simple neural network includes: an input layer, a hidden layer, and an output layer, as shown in FIG. 4. The input layer is responsible for receiving data, the hidden layer processes the data, and the final result is generated in the output layer. Here, each node represents a processing unit, which can be regarded as a simulation of a neuron. Multiple neurons form a layer of neural network, and multiple layers of information transmission and processing construct an overall neural network.

With the continuous development of the researches on neural networks, the deep learning algorithm for the neural network is introduced, and more hidden layers are introduced. Feature learning is carried out through layer-by-layer training of the neural network with multiple hidden layers, which greatly improves the learning and processing ability of the neural network. Neural networks are widely used in pattern recognition, signal processing, optimization combination, anomaly detection, etc.

Figure 5:
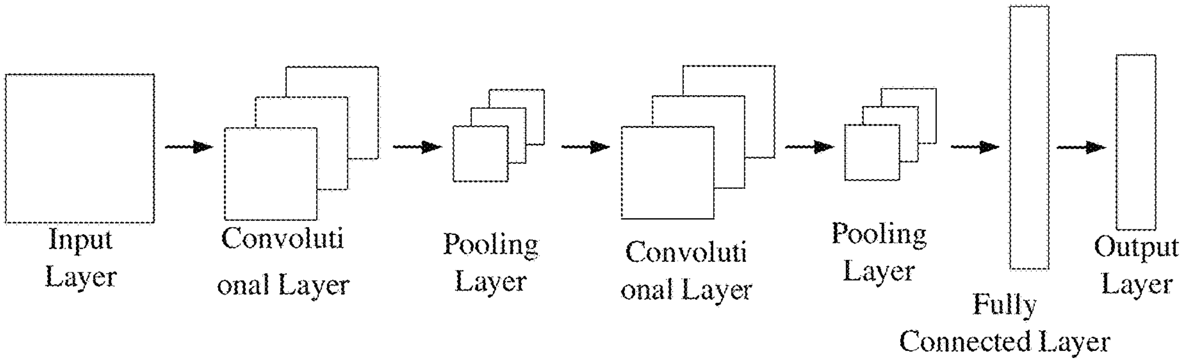
FIG. 5 is a schematic diagram showing a convolutional neural network according to the present disclosure.

Similarly, with the development of deep learning, Convolutional Neural Network (CNN) has been further studied. In a convolutional neural network, its basic structure includes: an input layer, multiple convolutional layers, multiple pooling layers, a fully connected layer, and an output layer, as shown in FIG. 5. The introduction of the convolutional layer and the pooling layer effectively controls the sharp increase of network parameters, limits the number of parameters and exploits characteristics of local structures, thereby improving the robustness of the algorithm.

In order to better understand the embodiments of the present disclosure, the technical problems to be solved in the present disclosure will be described.

Although conventional algorithms such as LS and Minimum Mean Square Error (MMSE) can be used for channel estimation and channel restoration based on reference signals, due to the complexity and time-varying characteristics of actual channels, it is often difficult for these conventional solutions to achieve the optimum channel estimation and channel restoration effects, which in turn affects the performance of subsequent data restoration and channel information feedback. Moreover, in the conventional schemes, after the channel estimation, it is necessary to interpolate the estimated channel based on the pilot position to restore the channel on full time-frequency resources. However, the current interpolation algorithms need statistics such as the correlation between the pilot position channel and the data position channel as a priori information, e.g., by means of information such as Power Delay Profile (PDP) to assist channel interpolation restoration. Generally speaking, this information needs to be obtained in advance by means of a Tracking Reference Signal (TRS), but in actual systems, the TRS will occupy certain system resources and bring additional overhead.

Based on the above technical problems, the present disclosure provides a neural network based channel restoration solution, which can perform channel restoration based on a neural network, thereby improving channel restoration performance, and in turn improving data restoration and channel feedback performance.

The technical solutions of the present disclosure will be described in detail below with reference to specific embodiments.

Figure 6:
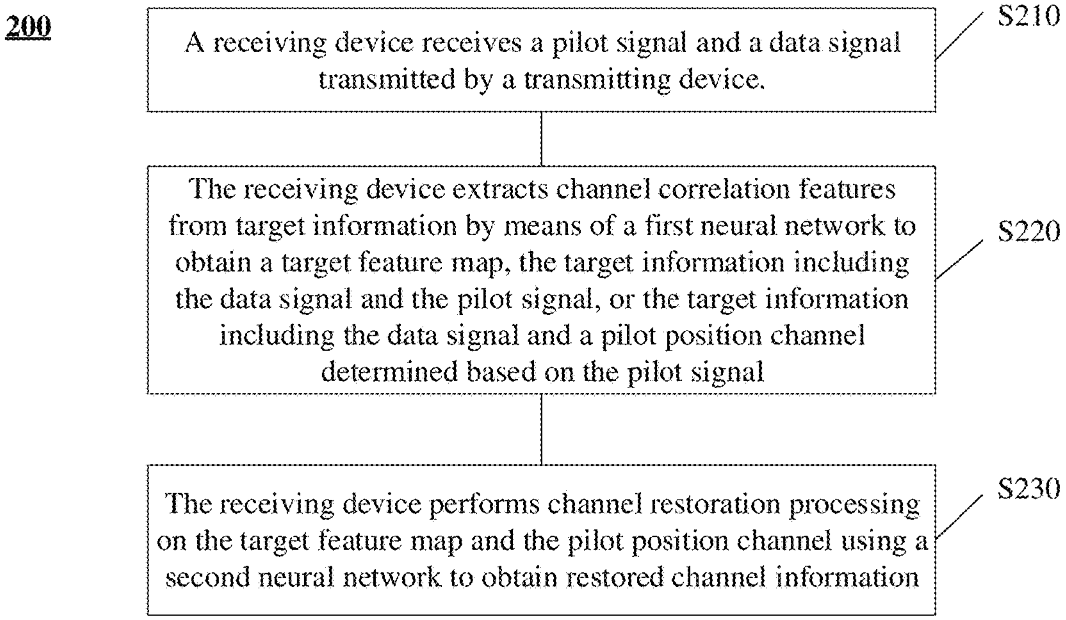
FIG. 6 is a schematic flowchart illustrating a channel restoration method according to an embodiment of the present disclosure.

FIG. 6 is a schematic flowchart illustrating a channel restoration method 200 according to an embodiment of the present disclosure. As shown in FIG. 6, the channel restoration method 200 may include at least part of the following content.

At S210, a receiving device receives a pilot signal and a data signal transmitted by a transmitting device.

At S220, the receiving device extracts channel correlation features from target information by means of a first neural network to obtain a target feature map, the target information including the data signal and the pilot signal, or the target information including the data signal and a pilot position channel determined based on the pilot signal.

At S230, the receiving device performs channel restoration processing on the target feature map and the pilot position channel by means of a second neural network to obtain restored channel information.

In an embodiment of the present disclosure, the transmitting device may place pilot symbols and data symbols on configured time-frequency resources, and transmits them to the receiving device via an air interface. The signal received by the receiving device may be shown in Equation (1).

$$\begin{aligned} Y &= HX + N \\ &= H[P; D] + N \\ &= [\text{H\_p, 0; 0, H\_d}] + N \\ &= [\text{Y\_p; Y\_d}] \end{aligned} \tag{1}$$

where Y represents the signal received by the receiving device, X represents all symbols transmitted by the transmitting device, P represents pilot symbols, D represents data symbols, H_p represents a pilot position channel, i.e., channel information corresponding to pilot symbol positions, H_d represents a data position channel, i.e., channel information corresponding to data symbol positions, Y_p represents the pilot signal, Y_d represents the data signal, N represents additive noise, and H represents channel information on full time-frequency resources.

Specifically, Y_p=H_p*p, where p represents a pilot symbol vector; Y_d=H_d*d, where d represents a data symbol vector. The channel restoration process considers by means of the signals Y (Y_p and Y_d) received by the receiving device and the known pilot symbol vector p to estimate and restore the channel information H on the full time-frequency resources.

In an embodiment of the present disclosure, Y_p=H_p*p, where Y_p and p are known to the receiving device; Y_d=H_d*d, where Y_d is known to the receiving device, and each element of the data symbol vector d is selected from a data modulation symbol set S, that is, the data symbol vector d is also in a vector space with certain constellation point characteristics. Therefore, Y_d includes channel characteristics of the data symbol positions and the constellation point set characteristics of the data symbols, which can be used as a certain representation of the data position channel to extract a correlation characteristic.

It should be noted that the data modulation symbol set S is a finite set composed of modulation symbols.

In some embodiments, the receiving device may be a terminal device, and the transmitting device may be a network device; or the receiving device may be a network device, and the transmitting device may be a terminal device.

In some embodiments, the receiving device may be a terminal device and the transmitting device is another terminal device.

In some other embodiments, the transmitting device may be a network device, and the receiving device may be another network device.

It should be understood that, for different transmitting devices and receiving devices, different reference signals may be used. For example, if the transmitting device is a terminal device and the receiving device is a network device, the reference signal may be a DMRS.

In some embodiments, the first neural network may be e.g., a CNN or another neural network with high feature extraction performance, and the present disclosure is not limited to this.

For example, the first neural network may include, but not limited to, being constructed and implemented based on one or more of basic neural network structures such as fully connected layers, convolutional layers, recurrent neural network layers, and activation function layers.

In some embodiments, the second neural network may be e.g., a CNN or another neural network with high signal processing performance, and the present disclosure is not limited to this.

For example, the second neural network may include, but not limited to, being constructed and implemented based on one or more of basic neural network structures such as fully connected layers, convolutional layers, recurrent neural network layers, and activation function layers.

In some embodiments, the first neural network and the second neural network may be a same type of neural network, or may be different types of neural networks, and the present disclosure is not limited to this.

In some embodiments, when the target information includes the data signal and the pilot signal, the target information may further include a data modulation symbol set and/or a pilot symbol vector.

In some embodiments, when the target information includes the data signal and the pilot position channel, the target information may further include a data modulation symbol set.

In some embodiments, the pilot symbol vector may be pre-configured or agreed in a protocol, or the pilot symbol vector may be configured by a network device. That is, the pilot symbol vector is known to the receiving device.

In some embodiments, the data modulation symbol set may be pre-configured or agreed in a protocol, or the data modulation symbol set may be configured by a network device. That is, the set of data modulation symbols is known to the receiving device.

In some embodiments, the receiving device determines the pilot position channel according to the pilot signal and a pilot symbol vector. For example, the receiving device may determine the pilot position channel (H_p) based on the pilot signal (Y_p) and the pilot symbol vector (p) by means of the LS or MMSE algorithm.

In some embodiments, the receiving device may perform channel estimation on the pilot signal by means of a third neural network to obtain the pilot position channel; or the receiving device may perform channel estimation on the pilot signal and a pilot symbol vector by means of the third neural network to obtain the pilot position channel.

In some embodiments, the third neural network may be e.g., a CNN or another neural network with high signal processing performance, and the present disclosure is not limited to this.

For example, the third neural network may include, but not limited to, being constructed and implemented based on one or more of basic neural network structures such as fully connected layers, convolutional layers, recurrent neural network layers, and activation function layers.

In some embodiments, when the receiving device performs channel estimation on the pilot signal by means of the third neural network, the third neural network may be trained as follows:

obtaining a first training sample set, each training sample in the first training sample set including a pilot signal and a pilot position channel; and training the third neural network according to the first training sample set.

It should be noted that the number of training samples in the first training sample set can be set according to requirements. The pilot signal and the pilot position channel have the following meaning. The pilot signal is a signal that requires channel estimation, and the pilot position channel is an expected result obtained by performing channel estimation processing on the pilot signal by means of the third neural network.

Specifically, the goal of model training is to obtain better model parameters to improve the effect of channel estimation. During training, the pilot signal is inputted into the third neural network, and then the model parameters are adjusted according to the difference between the channel estimation result outputted by the third neural network and the pilot position channel, such that the result obtained by performing channel estimation according to the adjusted model parameters is getting closer and closer to the pilot position channel, until a model convergence condition is satisfied, and finally the trained third neural network can be obtained.

In some embodiments, when the receiving device performs channel estimation on the pilot signal and the pilot symbol vector by means of the third neural network, the third neural network may be trained as follows:

obtaining a second training sample set, each training sample in the second training sample set includes a pilot signal, a pilot symbol vector, and a pilot position channel; and training the third neural network according to the second training sample set.

It should be noted that the number of training samples in the second training sample set can be set according to requirements. The pilot signal, the pilot symbol vector and the pilot position channel having the following meaning. The pilot signal and the pilot symbol vector are signals that require channel estimation, and the pilot position channel is an expected result obtained by performing channel estimation processing on the pilot signal by means of the third neural network.

Specifically, the goal of model training is to obtain better model parameters to improve the effect of channel estimation. During training, the pilot signal and the pilot symbol vector are inputted into the third neural network, and then the model parameters are adjusted according to the difference between the channel estimation result outputted by the third neural network and the pilot position channel, such that the result obtained by performing channel estimation according to the adjusted model parameters is getting closer and closer to the pilot position channel, until a model convergence condition is satisfied, and finally the trained third neural network can be obtained.

Figure 7:
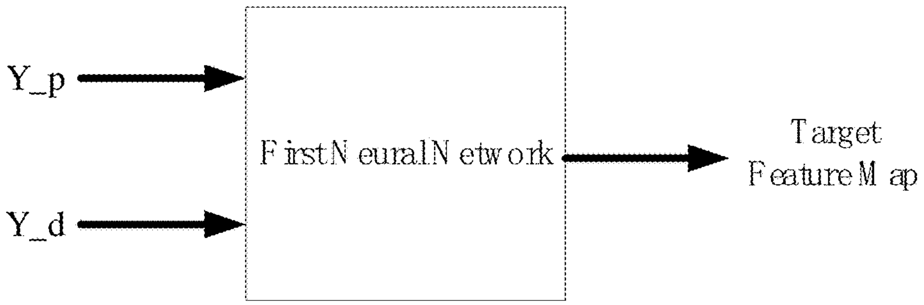
FIGS. 7 to 16 are schematic diagrams each showing a first neural network according to an embodiment of the present disclosure.

Example 1: The above target information includes a data signal and a pilot signal. That is, the receiving device extracts channel correlation features from the data signal (Y_d) and the pilot signal (Y_p) by means of a first neural network to obtain a target feature map. As shown in FIG. 7, the receiving device uses the data signal (Y_d) and the pilot signal (Y_p) as the input to the first neural network, and the output of the first neural network is the target feature map.

Figure 8:
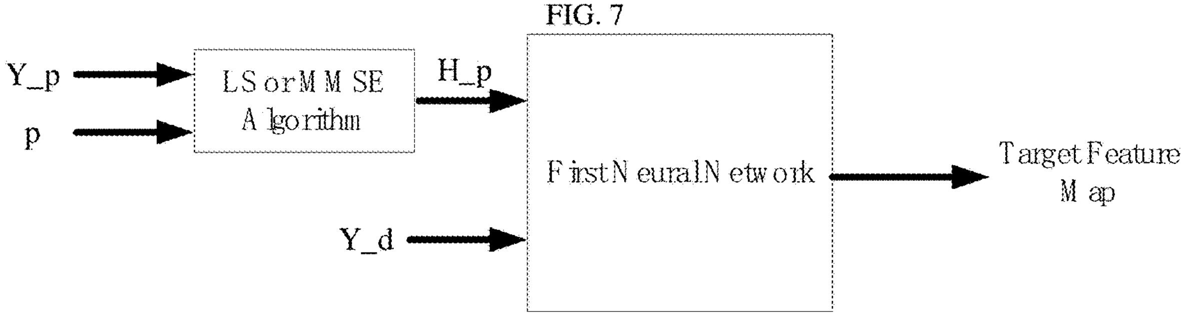
Figure 9:
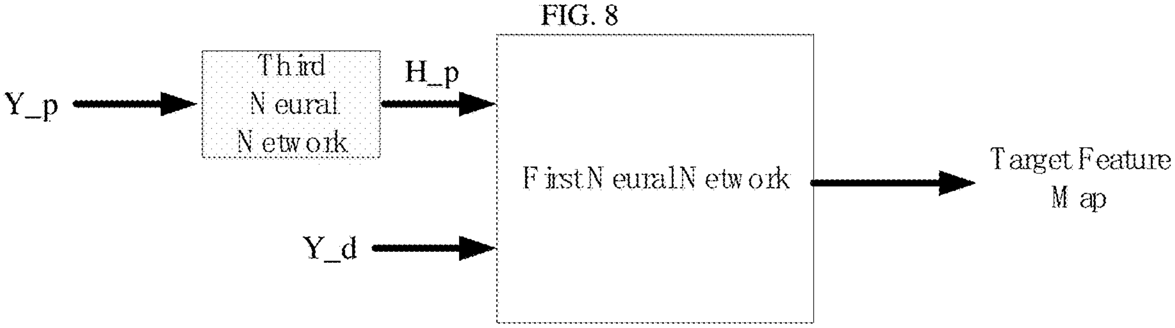
Figure 10:
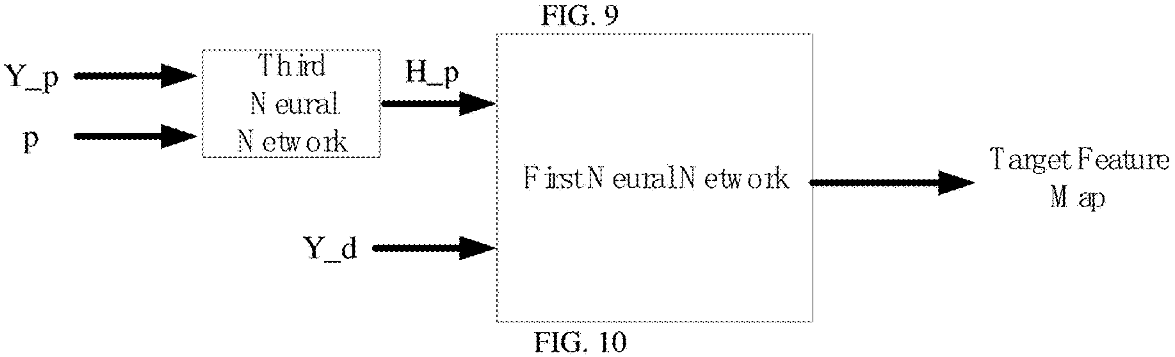

Example 2: The above target information includes a data signal and a pilot position channel determined based on a pilot signal. That is, the receiving device extracts channel correlation features from the data signal (Y_d) and the pilot position channel (H_p) by means of a first neural network to obtain a target feature map. As shown in FIG. 8 or FIG. 9 or FIG. 10, the receiving device uses the data signal (Y_d) and the pilot position channel (H_p) as the input to the first neural network, and the output of the first neural network is the target feature map.

For example, as shown in FIG. 8, the receiving device determines the pilot position channel (H_p) based on the pilot signal (Y_p) and the pilot symbol vector (p) by means of the LS or MMSE algorithm.

In another example, as shown in FIG. 9, the receiving device performs channel estimation on the pilot signal (Y_p) by means of a third neural network to obtain the pilot position channel (H_p).

In another example, as shown in FIG. 10, the receiving device performs channel estimation on the pilot signal (Y_p) and the pilot symbol vector (p) by means of a third neural network to obtain the pilot position channel (H_p).

Figure 11:
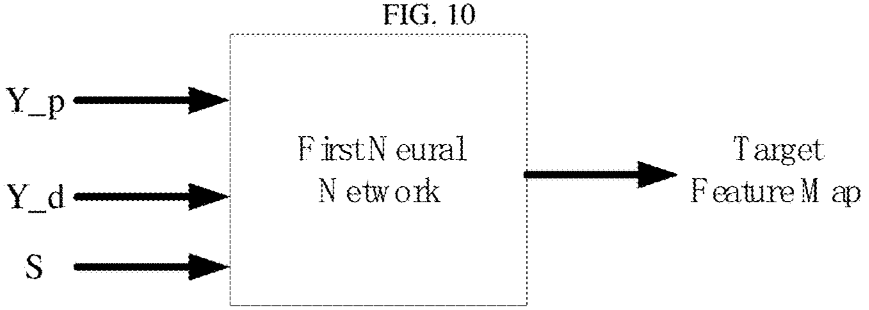

Example 3: The above target information includes a data signal, a pilot signal, and a data modulation symbol set. That is, the receiving device extracts channel correlation features from the data signal (Y_d), the pilot signal (Y_p) and the data modulation symbol set (S) by means of a first neural network to obtain a target feature map. As shown in FIG. 11, the receiving device uses the data signal (Y_d), the pilot signal (Y_p) and the data modulation symbol set (S) as the input to the first neural network, and the output of the first neural network is the target feature map.

It should be noted that, when the pilot symbol vector (p) and the data modulation symbol set (S) remain unchanged in the practical application stage and the training stage, the first neural network in Example 1 above can adaptively learn the information of the pilot symbol vector (p) and the data modulation symbol set (S) in the training stage, that is, the first neural network is only adapted to the single fixed pilot symbol vector (p) and data modulation symbol set (S). In practical applications, when the communication system introduces adaptive modulation, that is, when the data modulation symbol set (S) may change, the first neural network in Example 3 can be used, and the model training can be adapted to the first neural network when the data modulation symbol set (S) changes in practical applications.

Figure 12:
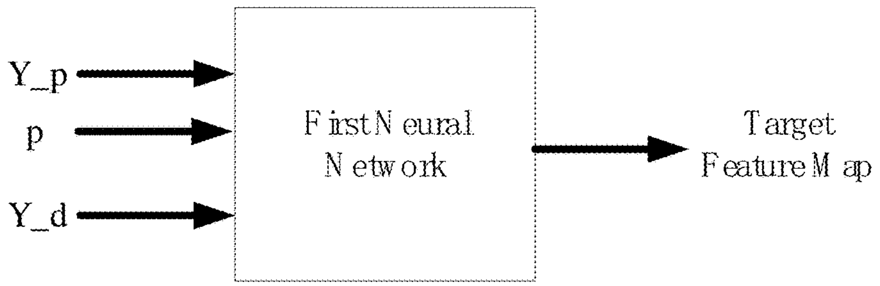

Example 4: The above target information includes a data signal, a pilot signal, and a pilot symbol vector. That is, the receiving device extracts channel correlation features from the data signal (Y_d), the pilot signal (Y_p) and the pilot symbol vector (p) by means of a first neural network to obtain a target feature map. As shown in FIG. 12, the receiving device uses the data signal (Y_d), the pilot signal (Y_p) and the pilot symbol vector (p) as the input to the first neural network, and the output of the first neural network is the target feature map.

It should be noted that, when the pilot symbol vector (p) and the data modulation symbol set (S) remain unchanged, the first neural network in Example 1 above can adaptively learn the information of the pilot symbol vector (p) and the data modulation symbol set (S) in the training stage, that is, the first neural network is only adapted to the single fixed pilot symbol vector (p) and data modulation symbol set (S). In practical applications, when the pilot symbol vector (p) changes, the first neural network in Example 4 can be used, and the model training can be adapted to the first neural network when the pilot symbol vector (p) changes in practical applications.

Figure 13:
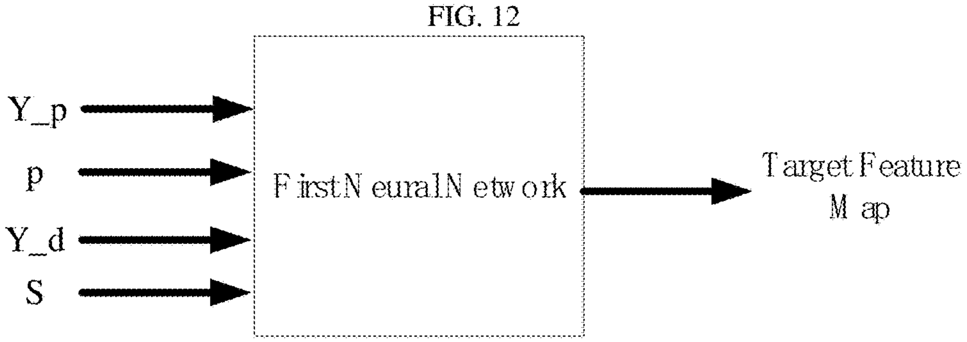

Example 5: The above target information includes a data signal, a pilot signal, a pilot symbol vector, and a data modulation symbol set. That is, the receiving device extracts channel correlation features from the data signal (Y_d), the pilot signal (Y_p), the pilot symbol vector (p) and the data modulation symbol set (S) by means of a first neural network to obtain a target feature map. As shown in FIG. 13, the receiving device uses the data signal (Y_d), the pilot signal (Y_p), the pilot symbol vector (p) and the data modulation symbol set (S) as the input to the first neural network, and the output of the first neural network is the target feature map.

It should be noted that, when the pilot symbol vector (p) and the data modulation symbol set (S) remain unchanged, the first neural network in Example 1 above can adaptively learn the information of the pilot symbol vector (p) and the data modulation symbol set (S) in the training stage, that is, the first neural network is only adapted to the single fixed pilot symbol vector (p) and data modulation symbol set (S). In practical applications, when the pilot symbol vector (p) and the data modulation symbol set (S) change, the first neural network in Example 5 can be used, and the model training can be adapted to the first neural network when the pilot symbol vector (p) and the data modulation symbol set (S) change in practical applications.

Figure 14:
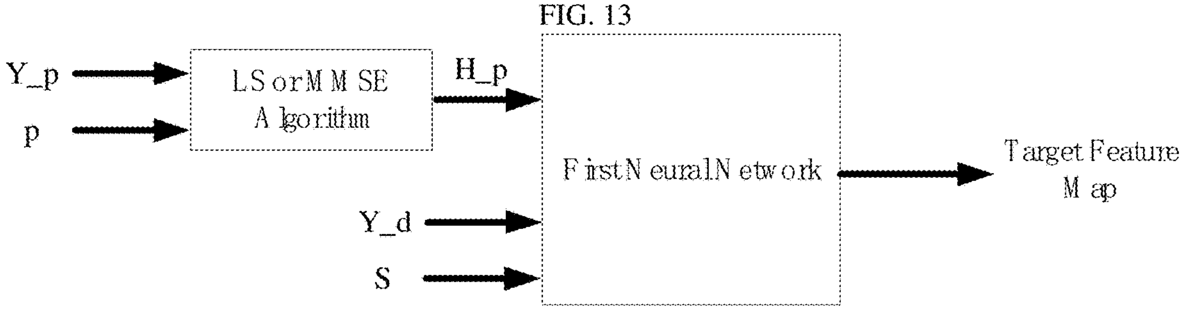
Figure 15:
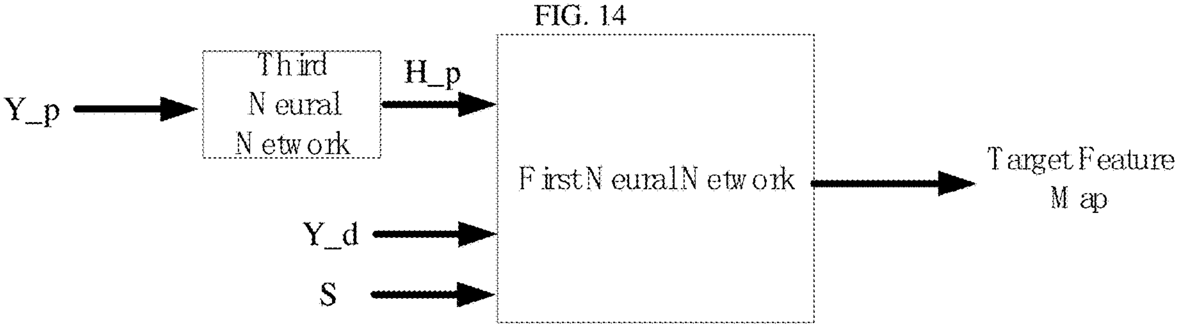
Figure 16:
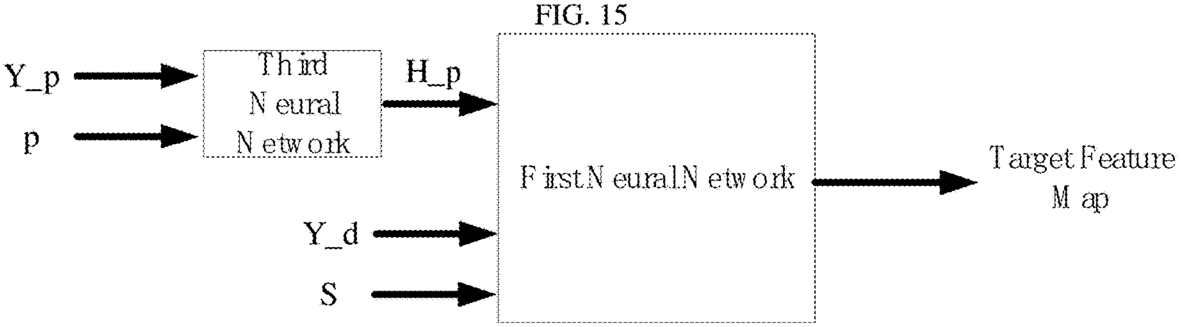

Example 6: The above target information includes a data signal, a pilot position channel, and a data modulation symbol set. That is, the receiving device extracts channel correlation features from the data signal (Y_d), the pilot position channel (H_p) and the data modulation symbol set (S) by means of a first neural network to obtain a target feature map. As shown in FIG. 14 or FIG. 15 or FIG. 16, the receiving device uses the data signal (Y_d), the pilot position channel (H_p) and the data modulation symbol set (S) as the input to the first neural network, and the output of the first neural network is the target feature map.

For example, as shown in FIG. 14, the receiving device determines the pilot position channel (H_p) based on the pilot signal (Y_p) and the pilot symbol vector (p) by means of the LS or MMSE algorithm.

In another example, as shown in FIG. 15, the receiving device performs channel estimation on the pilot signal (Y_p) by means of a third neural network to obtain the pilot position channel (H_p).

In another example, as shown in FIG. 16, the receiving device performs channel estimation on the pilot signal (Y_p) and the pilot symbol vector (p) by means of a third neural network to obtain the pilot position channel (H_p).

In some embodiments, the first neural network and the second neural network can be obtained by means of joint training. Specifically, for example, the first neural network and the second neural network can be trained as follows:

obtaining a third training sample set; and training the first neural network and the second neural network jointly according to the third training sample set.

In some implementations, each training sample in the third training sample set may include a data signal, a pilot signal, a pilot position channel, and restored channel information.

In some implementations, each training sample in the third training sample set may include a data signal, a pilot position channel, and restored channel information.

In some implementations, each training sample in the third training sample set may include a data signal, a pilot position channel, a data modulation symbol set, and restored channel information.

In some implementations, each training sample in the third training sample set may include a data signal, a pilot signal, a data modulation symbol set, a pilot position channel, and restored channel information.

In some implementations, each training sample in the third training sample set may include a data signal, a pilot signal, a pilot symbol vector, a pilot position channel, and restored channel information.

In some implementations, each training sample in the third training sample set may include a data signal, a pilot signal, a data modulation symbol set, a pilot symbol vector, a pilot position channel, and restored channel information.

It should be noted that the number of training samples in the third training sample set can be set according to requirements. Assuming that each training sample in the third training sample set includes a data signal, a pilot signal, a pilot position channel, and restored channel information, the data signal, pilot signal, pilot position channel, and restored channel information having the following meaning. The data signal, pilot signal, and pilot position channel are signals that require channel restoration, and the restored channel information is an expected result obtained by performing channel restoration processing on the data signal, pilot signal, and pilot position channel by means of the first neural network and the second neural network.

It should be understood that each training sample in the third training sample set may include other information, to which similar description applies, and details thereof will be omitted here.

Figure 17:
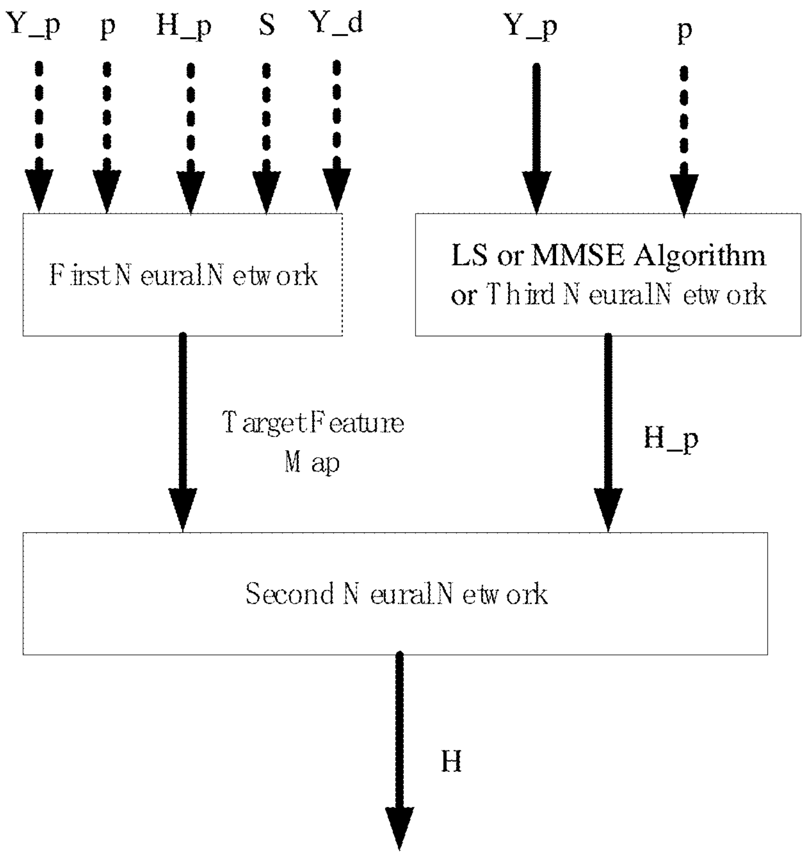
FIG. 17 is a schematic diagram showing channel restoration according to an embodiment of the present disclosure.

In some embodiments, as shown in FIG. 17, the receiving device may perform channel restoration based on the first neural network and the second neural network. The input to the first neural network is at least one of the pilot signal (Y_p), data signal (Y_d), pilot symbol vector (p), data modulation symbol set (S), and pilot position channel (H_p), and the output is the target feature map. For details, reference can be made to the above descriptions corresponding to the FIGS. 7 to 16. The input to the second neural network is the target feature map and the pilot position channel (H_p), and the output is the restored channel information (that is, the channel information H on the full time-frequency resources).

As shown in FIG. 17, the receiving device can determine the pilot position channel (H_p) based on the pilot signal (Y_p) and the pilot symbol vector (p) by means of the LS or MMSE algorithm. Alternatively, the receiving device may perform channel estimation on the pilot signal (Y_p) by means of the third neural network to obtain the pilot position channel (H_p). Alternatively, the receiving device may perform channel estimation on the pilot signal (Y_p) and the pilot symbol vector (p) by means of the third neural network to obtain the pilot position channel (H_p).

Therefore, in the embodiment of the present disclosure, the channel restoration can be performed based on the neural network, thereby improving the channel restoration performance, and in turn improving the data restoration and channel feedback performance.

Further, in the embodiment of the present disclosure, it is possible to reduce the additional overhead caused by the need for reference signals to obtain channel correlation features in the existing methods. Compared with the existing schemes that only use pilots as the channel estimation and restoration network inputs, the channel restoration performance can be further improved.

Figure 18:
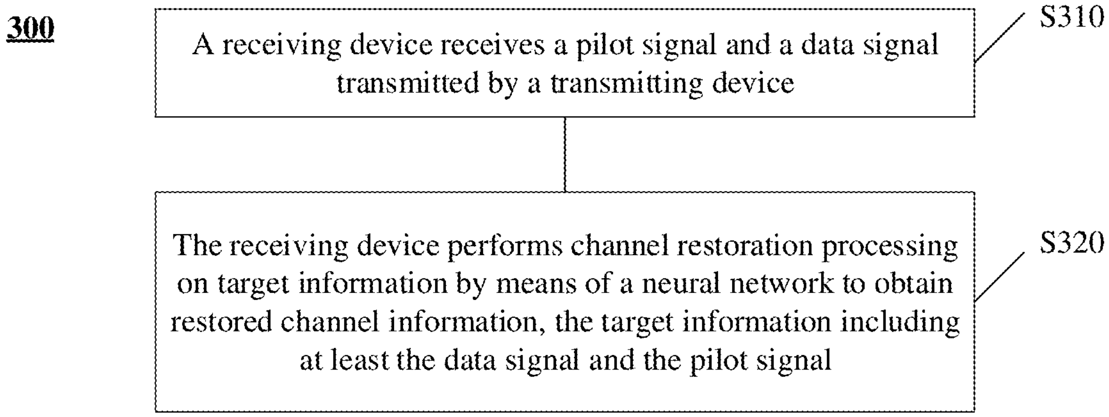
FIG. 18 is a schematic flowchart illustrating another channel restoration method according to an embodiment of the present disclosure.

FIG. 18 is a schematic flowchart illustrating a channel restoration method 300 according to an embodiment of the present disclosure. As shown in FIG. 18, the channel restoration method 300 may include at least some of the following content.

At S310, a receiving device receives a pilot signal and a data signal transmitted by a transmitting device.

At S320, the receiving device performs channel restoration processing on target information by means of a neural network to obtain restored channel information, the target information including at least the data signal and the pilot signal.

In an embodiment of the present disclosure, the transmitting device may place pilot symbols and data symbols on configured time-frequency resources, and transmits them to the receiving device via an air interface. The signal received by the receiving device may be shown in Equation (1).

$$\begin{aligned} Y &= HX + N \\ &= H[P; D] + N \\ &= [\mathrm{H\_p}, 0; 0, \mathrm{H\_d}] + N \\ &= [\mathrm{Y\_p}; \mathrm{Y\_d}] \end{aligned} \tag{1}$$

where Y represents the signal received by the receiving device, X represents all symbols transmitted by the transmitting device, P represents pilot symbols, D represents data symbols, H_p represents a pilot position channel, i.e., channel information corresponding to pilot symbol positions, H_d represents a data position channel, i.e., channel information corresponding to data symbol positions, Y_p represents the pilot signal, Y_d represents the data signal, N represents additive noise, and H represents channel information on full time-frequency resources.

Specifically, Y_p=H_p*p, where p represents a pilot symbol vector; Y_d=H_d*d, where d represents a data symbol vector. The channel restoration process considers by means of the signals Y (Y_p and Y_d) received by the receiving device and the known pilot symbol vector p to estimate and restore the channel information H on the full time-frequency resources.

In an embodiment of the present disclosure, Y_p=H_p*p, where Y_p and p are known to the receiving device; Y_d=H_d*d, where Y_d is known to the receiving device, and each element of the data symbol vector d is selected from a data modulation symbol set S, that is, the data symbol vector d is also in a vector space with certain constellation point characteristics. Therefore, Y_d includes channel characteristics of the data symbol positions and the constellation point set characteristics of the data symbols, which can be used as a certain representation of the data position channel to extract a correlation characteristic.

It should be noted that the data modulation symbol set S is a finite set composed of modulation symbols.

In some embodiments, the receiving device may be a terminal device, and the transmitting device may be a network device; or the receiving device may be a network device, and the transmitting device may be a terminal device.

In some embodiments, the receiving device may be a terminal device and the transmitting device is another terminal device.

In some other embodiments, the transmitting device may be a network device, and the receiving device may be another network device.

It should be understood that, for different transmitting devices and receiving devices, different reference signals may be used. For example, if the transmitting device is a terminal device and the receiving device is a network device, the reference signal may be a DMRS.

In some embodiments, the neural network may be e.g., a CNN or another neural network with high feature extraction performance, and the present disclosure is not limited to this.

For example, the neural network may include, but not limited to, being constructed and implemented based on one or more of basic neural network structures such as fully connected layers, convolutional layers, recurrent neural network layers, and activation function layers.

In some embodiments, the target information may further include a data modulation symbol set and/or a pilot symbol vector.

In some embodiments, the pilot symbol vector may be pre-configured or agreed in a protocol, or the pilot symbol vector may be configured by a network device. That is, the pilot symbol vector is known to the receiving device.

In some embodiments, the data modulation symbol set may be pre-configured or agreed in a protocol, or the data modulation symbol set may be configured by a network device. That is, the set of data modulation symbols is known to the receiving device.

In the embodiment of the present disclosure, the neural network is an end-to-end network, the target information is used as the input to the neural network, and the neural network outputs the restored channel information (i.e., the channel information H on the full time-frequency resources). Compared with the solution in the channel restoration method 200 described above, the end-to-end neural network can be used to adaptively train and extract correlation features, and the degree of freedom for the neural network to learn can be higher.

In some embodiments, the neural network can be trained by:

- obtaining a training sample set; and
- training the neural network according to the training sample set.

In some implementations, each training sample in the training sample set may include a data signal, a pilot signal, and restored channel information.

In some implementations, each training sample in the training sample set may include a data signal, a pilot signal, a data modulation symbol set, and restored channel information.

In some implementations, each training sample in the training sample set may include a data signal, a pilot signal, a pilot symbol vector, and restored channel information.

In some implementations, each training sample in the training sample set may include a data signal, a pilot signal, a pilot symbol vector, a data modulation symbol set, and restored channel information.

It should be noted that the number of training samples in the above training sample set can be set according to requirements. Assuming that each training sample in the training sample set includes a data signal, a pilot signal, and restored channel information, the data signal, pilot signal, and restored channel information having the following meaning. The data signal and pilot signal are signals that require channel restoration, and the restored channel information is an expected result obtained by performing channel restoration processing on the data signal and pilot signal by means of the neural network.

Specifically, the goal of model training is to obtain better model parameters to improve the effect of channel restoration. During training, the data signal and the pilot signal are inputted into the neural network, and then the model parameters are adjusted according to the difference between the channel restoration result outputted by the neural network and the restored channel information, such that the result obtained by performing channel estimation according to the adjusted model parameters is getting closer and closer to the data signal and the restored channel information, until a model convergence condition is satisfied, and finally the trained neural network can be obtained.

It should be understood that each training sample in the training sample set may include other information, to which similar description applies, and details thereof will be omitted here.

Figure 19:
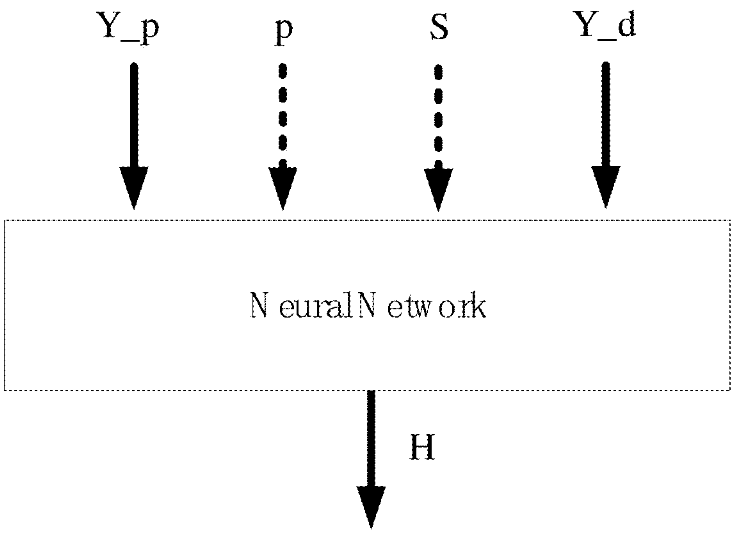
FIG. 19 is a schematic diagram showing another channel restoration according to an embodiment of the present disclosure.

In some embodiments, as shown in FIG. 19, the receiving device can perform channel restoration based on a neural network. The necessary input to the neural network is the pilot signal (Y_p) and the data signal (Y_d), the optional input is the pilot symbol sequence (p) and the data modulation symbol set (S), and the output is the restored channel information (that is, the channel information H on the full time-frequency resources).

For example, if the pilot symbol sequence (p) changes in practical applications, the pilot symbol sequence (p) can also be used as the input to the neural network.

In another example, if the data modulation symbol set (S) changes in practical applications, the data modulation symbol set (S) can also be used as the input to the neural network.

In another example, the pilot symbol sequence (p) and the data modulation symbol set (S) change in practical applications, and the pilot symbol sequence (p) and the data modulation symbol set (S) can also be used as the input to the neural network.

Therefore, in the embodiment of the present disclosure, the channel restoration can be performed based on the neural network, thereby improving the channel restoration performance, and in turn improving the data restoration and channel feedback performance.

Further, in the embodiment of the present disclosure, it is possible to reduce the additional overhead caused by the need for reference signals to obtain channel correlation features in the existing methods. Compared with the existing schemes that only use pilots as the channel estimation and restoration network inputs, the channel restoration performance can be further improved.

The method embodiments of the present disclosure have been described in detail above with reference to FIGS. 6-19, and the apparatus embodiments of the present disclosure will be described in detail below with reference to FIGS. 20-24. It can be appreciated that the apparatus embodiments and the method embodiments correspond to each other, and for similar descriptions, reference can be made to the method embodiments.

Figure 20:
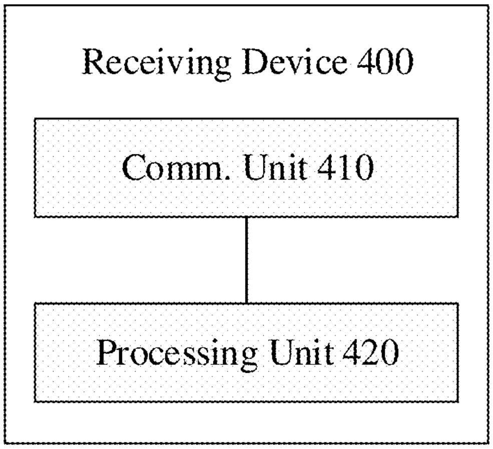
FIG. 20 is a schematic block diagram of a receiving device according to an embodiment of the present disclosure.

FIG. 20 shows a schematic block diagram of a receiving device 400 according to an embodiment of the present disclosure. As shown in FIG. 5, the receiving device 400 includes:

- a communication unit 410 configured to receive a pilot signal and a data signal transmitted by a transmitting device; and
- a processing unit 420 configured to extract channel correlation features from target information by means of a first neural network to obtain a target feature map, the target information including the data signal and the pilot signal, or the target information including the data signal and a pilot position channel determined based on the pilot signal;
- the processing unit 420 being further configured to perform channel restoration processing on the target feature map and the pilot position channel by means of a second neural network to obtain restored channel information.

In some embodiments, when the target information includes the data signal and the pilot signal, the target information may further include a data modulation symbol set and/or a pilot symbol vector.

In some embodiments, when the target information includes the data signal and the pilot position channel, the target information may further include a data modulation symbol set.

In some embodiments, the data modulation symbol set may be pre-configured or agreed in a protocol, or the data modulation symbol set may be configured by a network device.

In some embodiments, the processing unit 420 may be further configured to determine the pilot position channel according to the pilot signal and a pilot symbol vector.

In some embodiments, the processing unit 420 may be further configured to perform channel estimation on the pilot signal by means of a third neural network to obtain the pilot position channel; or perform channel estimation on the pilot signal and a pilot symbol vector by means of the third neural network to obtain the pilot position channel.

In some embodiments, the pilot symbol vector may be pre-configured or agreed in a protocol, or the pilot symbol vector may be configured by a network device.

In some embodiments, when the receiving device performs channel estimation on the pilot signal by means of the third neural network:

- the communication unit 410 may be further configured to obtain a first training sample set, each training sample in the first training sample set including a pilot signal and a pilot position channel; and
- the processing unit 420 may be further configured to train the third neural network according to the first training sample set.

In some embodiments, when the receiving device performs channel estimation on the pilot signal and the pilot symbol vector by means of the third neural network:

- the communication unit 410 may be further configured to obtain a second training sample set, each training sample in the second training sample set includes a pilot signal, a pilot symbol vector, and a pilot position channel; and
- the processing unit 420 may be further configured to train the third neural network according to the second training sample set.

In some embodiments, the communication unit 410 may be further configured to obtain a third training sample set, each training sample in the third training sample set including a data signal, a pilot signal, a pilot position channel, and restored channel information, or each training sample in the third training sample set including a data signal, a pilot position channel, and restored channel information; and

- the processing unit 420 may be further configured to train the first neural network and the second neural network jointly according to the third training sample set.

In some embodiments, the above communication unit may be a communication interface or a transceiver, or an input/output interface of a communication chip or a system-on-chip. The above processing unit may be one or more processors.

It can be appreciated that the receiving device 400 according to the embodiment of the present disclosure may correspond to the receiving device in the method embodiment of the present disclosure, and the above and other operations and/or functions of the respective units in the receiving device 400 are provided for the purpose of implementing the process flow corresponding to the receiving device in the method 200 shown in FIG. 6, and details thereof will be not omitted here for brevity.

Figure 21:
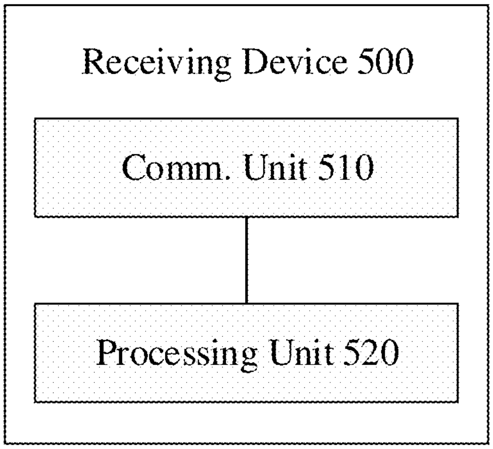
FIG. 21 is a schematic block diagram of another receiving device according to an embodiment of the present disclosure.

FIG. 21 shows a schematic block diagram of a receiving device 500 according to an embodiment of the present disclosure. As shown in FIG. 21, the receiving device 500 includes:

- a communication unit 510 configured to receive a pilot signal and a data signal transmitted by a transmitting device; and
- a processing unit 520 configured to perform channel restoration processing on target information by means of a neural network to obtain restored channel information, the target information including at least the data signal and the pilot signal.

In some embodiments, the target information may further include a data modulation symbol set and/or a pilot symbol vector.

In some embodiments, the pilot symbol vector may be pre-configured or agreed in a protocol, or the pilot symbol vector may be configured by a network device.

In some embodiments, the data modulation symbol set may be pre-configured or agreed in a protocol, or the data modulation symbol set may be configured by a network device.

In some embodiments, the communication unit 510 may be further configured to obtain a training sample set, each training sample in the training sample set including a data signal, a pilot signal, and restored channel information; and

- the processing unit 520 may be further configured to train the neural network according to the training sample set.

In some embodiments, the above communication unit may be a communication interface or a transceiver, or an input/output interface of a communication chip or a system-on-chip. The above processing unit may be one or more processors.

It can be appreciated that the receiving device 500 according to the embodiment of the present disclosure may correspond to the receiving device in the method embodiment of the present disclosure, and the above and other operations and/or functions of the respective units in the receiving device 500 are provided for the purpose of implementing the process flow corresponding to the receiving device in the method 300 shown in FIG. 18, and details thereof will be not omitted here for brevity.

Figure 22:
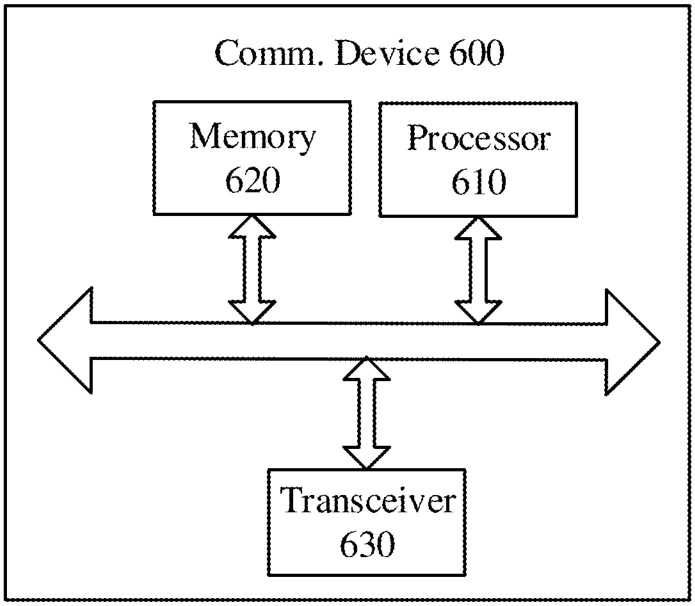
FIG. 22 is a schematic block diagram of a communication device according to an embodiment of the present disclosure.

FIG. 22 is a schematic diagram showing a structure of a communication device 600 according to an embodiment of the present disclosure. The communication device 600 shown in FIG. 22 includes a processor 610, and the processor 610 can invoke and execute a computer program from a memory to implement the method in the embodiment of the present disclosure.

In some embodiments, as shown in FIG. 22, the communication device 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

In some embodiments, as shown in FIG. 22, the communication device 600 may further include a transceiver 630, and the processor 610 may control the transceiver 630 to communicate with other devices, and in particular, transmit information or data to other devices, or receive information or data transmitted by other devices.

Here, the transceiver 630 may include a transmitter and a receiver. The transceiver 630 may further include one or more antennas.

In some embodiments, the communication device 600 may specifically be the receiving device according to the embodiment of the present disclosure, and the communication device 600 may implement the corresponding processes implemented by the receiving device in any of the methods according to the embodiments of the present disclosure. For the sake of brevity, details thereof will be omitted here.

Figure 23:
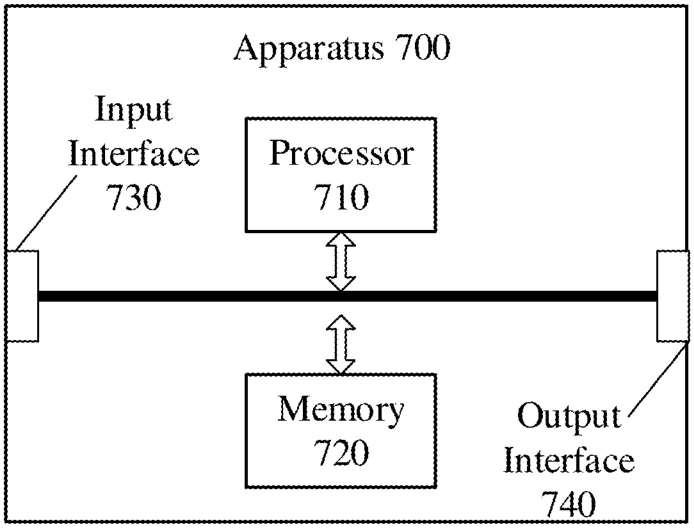
FIG. 23 is a schematic block diagram of an apparatus according to an embodiment of the present disclosure.

FIG. 23 is a schematic diagram showing a structure of an apparatus according to an embodiment of the present disclosure. The apparatus 700 shown in FIG. 23 includes a processor 710, and the processor 710 can invoke and execute a computer program from a memory to implement the method in the embodiment of the present disclosure.

In some embodiments, as shown in FIG. 23, the apparatus 700 may further include a memory 720. The processor 710 can invoke and execute a computer program from the memory 720 to implement the method in the embodiment of the present disclosure.

The memory 720 may be a separate device independent from the processor 710, or may be integrated in the processor 710.

In some embodiments, the apparatus 700 may further include an input interface 730. The processor 810 can control the input interface 730 to communicate with other devices or chips, and in particular, obtain information or data transmitted by other devices or chips.

In some embodiments, the apparatus 700 may further include an output interface 740. The processor 710 can control the output interface 740 to communicate with other devices or chips, and in particular, output information or data to other devices or chips.

In some embodiments, the apparatus can be applied to the receiving device in the embodiment of the present disclosure, and the apparatus can implement the corresponding processes implemented by the receiving device in the various methods of the embodiments of the present disclosure. For the sake of brevity, details thereof will be omitted here.

In some embodiments, the apparatus in the embodiment of the present disclosure may be a chip, e.g., a system-level chip, a system-chip, a chip system, or a system-on-chip.

Figure 24:
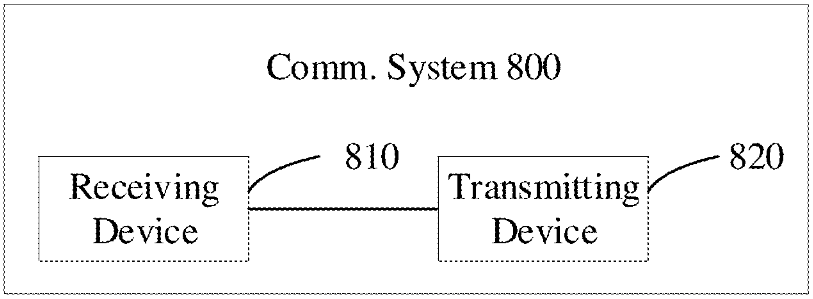
FIG. 24 is a schematic block diagram of a communication system according to an embodiment of the present disclosure.

FIG. 24 is a schematic block diagram showing a communication system 800 according to an embodiment of the present disclosure. As shown in FIG. 24, the communication system 800 includes a receiving device 810 and a transmitting device 820.

Here, the receiving device 810 can be configured to implement the corresponding functions implemented by the receiving device in the above method, and the transmitting device 820 can be configured to implement the corresponding functions implemented by the transmitting device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

In some embodiments, the computer readable storage medium can be applied to the receiving device in the embodiment of the present disclosure, and the computer program can cause a computer to perform corresponding procedures implemented by the receiving device in the method according to any of the embodiments of the present disclosure. Details thereof will be omitted here for simplicity.

An embodiment of the present disclosure also provides a computer program product including computer program instructions.

In some embodiments, the computer program product can be applied to the receiving device in the embodiment of the present disclosure, and the computer program instructions can cause a computer to perform corresponding procedures implemented by the receiving device in the method according to any of the embodiments of the present disclosure. Details thereof will be omitted here for simplicity.

An embodiment of the present disclosure also provides a computer program.

In some embodiments, the computer program can be applied to the receiving device in the embodiment of the present disclosure. The computer program, when executed on a computer, can cause the computer to perform corresponding procedures implemented by the receiving device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A channel restoration method, comprising:

receiving, by a receiving device, a pilot signal and a data signal transmitted by a transmitting device;

extracting, by the receiving device, channel correlation features from target information by means of a first neural network to obtain a target feature map, the target information comprising the data signal and the pilot signal, or the target information comprising the data signal and a pilot position channel determined based on the pilot signal; and performing, by the receiving device, channel restoration processing on the target feature map and the pilot position channel by means of a second neural network to obtain restored channel information.

2. The method according to claim 1, wherein when the target information comprises the data signal and the pilot signal, the target information further comprises a data modulation symbol set and/or a pilot symbol vector.

3. The method according to claim 1, wherein when the target information comprises the data signal and the pilot position channel, the target information further comprises a data modulation symbol set.

4. The method according to claim 1, further comprising:

obtaining a third training sample set, each training sample in the third training sample set comprising a data signal, a pilot signal, a pilot position channel, and restored channel information, or each training sample in the third training sample set comprising a data signal, a pilot position channel, and restored channel information; and training the first neural network and the second neural network jointly based on the third training sample set.

5. A non-transitory computer-readable storage medium, configured to store a computer program that enables a computer to perform the method according to claim 1.

6. The non-transitory computer-readable storage medium according to claim 5, wherein when the target information comprises the data signal and the pilot signal, the target information further comprises a data modulation symbol set and/or a pilot symbol vector.

7. The non-transitory computer-readable storage medium according to claim 5, wherein when the target information comprises the data signal and the pilot position channel, the target information further comprises a data modulation symbol set.

8. The non-transitory computer-readable storage medium according to claim 5, wherein the method further comprises:

obtaining a third training sample set, each training sample in the third training sample set comprising a data signal, a pilot signal, a pilot position channel, and restored channel information, or each training sample in the third training sample set comprising a data signal, a pilot position channel, and restored channel information; and training the first neural network and the second neural network jointly based on the third training sample set.

9. A channel restoration method, comprising:

receiving, by a receiving device, a pilot signal and a data signal transmitted by a transmitting device; and performing, by the receiving device, channel restoration processing on target information by means of a neural network to obtain restored channel information, the target information at least comprising the data signal and the pilot signal, wherein the target information further comprises a data modulation symbol set and/or a pilot symbol vector;

wherein the pilot symbol vector is pre-configured or agreed in a protocol, or the pilot symbol vector is configured by a network device; and the data modulation symbol set is pre-configured or agreed in a protocol, or the data modulation symbol set is configured by a network device.

10. The method according to claim 9, further comprising:

obtaining a training sample set, each training sample in the training sample set comprising a data signal, a pilot signal, and restored channel information; and training the neural network according to the training sample set.

11. A receiving device, comprising a processor and a memory, wherein the memory has a computer program stored thereon, and the processor is configured to invoke and execute the computer program stored in the memory to perform the method according to claim 9.

12. The receiving device according to claim 11, wherein the method further comprises:

obtaining a training sample set, each training sample in the training sample set comprising a data signal, a pilot signal, and restored channel information; and training the neural network according to the training sample set.

13. A non-transitory computer-readable storage medium, configured to store a computer program that enables a computer to perform the method according to claim 9.

14. A receiving device, comprising a processor and a memory, wherein the memory has a computer program stored thereon, and the processor is configured to invoke and execute the computer program stored in the memory to:

receive a pilot signal and a data signal transmitted by a transmitting device;

extract channel correlation features from target information by means of a first neural network to obtain a target feature map, the target information comprising the data signal and the pilot signal, or the target information comprising the data signal and a pilot position channel determined based on the pilot signal; and perform channel restoration processing on the target feature map and the pilot position channel by means of a second neural network to obtain restored channel information.

15. The receiving device according to claim 14, wherein when the target information comprises the data signal and the pilot signal, the target information further comprises a data modulation symbol set and/or a pilot symbol vector.

16. The receiving device according to claim 14, wherein when the target information comprises the data signal and the pilot position channel, the target information further comprises a data modulation symbol set.

17. The receiving device according to claim 14, wherein the processor is further configured to invoke and execute the computer program stored in the memory to:

obtain a third training sample set, each training sample in the third training sample set comprising a data signal, a pilot signal, a pilot position channel, and restored channel information, or each training sample in the third training sample set comprising a data signal, a pilot position channel, and restored channel information; and train the first neural network and the second neural network jointly based on the third training sample set.

* * * * *